United States Patent
Cargnel

(12) 
(10) Patent No.: US 6,378,181 B1
(45) Date of Patent: Apr. 30, 2002

(54) MANUFACTURING METHOD FOR SPECTACLES

(76) Inventor: Giuseppe Cargnel, 32044 Pozzale di Pieve di Cadore (BL), Vicolo del Mulino 4 (IT)

( * ) Notice: Subject to any disclaimer, the term of this patent is extended or adjusted under 35 U.S.C. 154(b) by 0 days.

(21) Appl. No.: 09/509,246
(22) PCT Filed: Jul. 22, 1999
(86) PCT No.: PCT/EP99/05254
 § 371 Date: Mar. 23, 2000
 § 102(e) Date: Mar. 23, 2000
(87) PCT Pub. No.: WO00/05615
 PCT Pub. Date: Feb. 3, 2000

(30) Foreign Application Priority Data

Jul. 24, 1998 (IT) .......................................... PN98A0055

(51) Int. Cl.⁷ .............................................. B21D 33/00
(52) U.S. Cl. .......................... 29/20; 29/505; 29/525.01; 351/178
(58) Field of Search ............................ 29/20, 434, 451, 29/463, 464, 505, 525.01, 525.11, 525.13; 140/71 R; 351/178, 66, 121, 141

(56) References Cited

U.S. PATENT DOCUMENTS

| 359,171 | A | * | 3/1887 | O'Hara | 29/20 |
| 1,546,485 | A | * | 7/1925 | Fraser | 29/20 |
| 1,635,699 | A | * | 7/1927 | Beattey | 29/20 |
| 2,682,196 | A | * | 6/1954 | Baldanza et al. | 351/83 |
| 5,764,337 | A | * | 6/1998 | Petignat | 351/153 |

FOREIGN PATENT DOCUMENTS

GB 154036 A * 11/1920 ................... 29/20

* cited by examiner

Primary Examiner—David P. Bryant
Assistant Examiner—Jermie E. Cozart

(57) ABSTRACT

Manufacturing method for spectacles with the use of first and second portions of profiled wire and a pattern having the same form and a size slightly greater than that of the lenses. The first and second wire portions are submitted in succession to different operative phases, in which they are adapted around the pattern so as to form frame half-portions which are shaped around the pattern with the outline of the lenses. The frame half-portions are joined to the respective bars through hinges which are attached to the corresponding frame half-portions, The frame half-portions are submitted, together with the bars to possible chemical treatments, the frame half-portions are applied to the lenses and the bars equipped with the respective terminal elements. Afterwards the nose-piece element is applied on to the assembly frame half-portions by tightening.

11 Claims, 5 Drawing Sheets

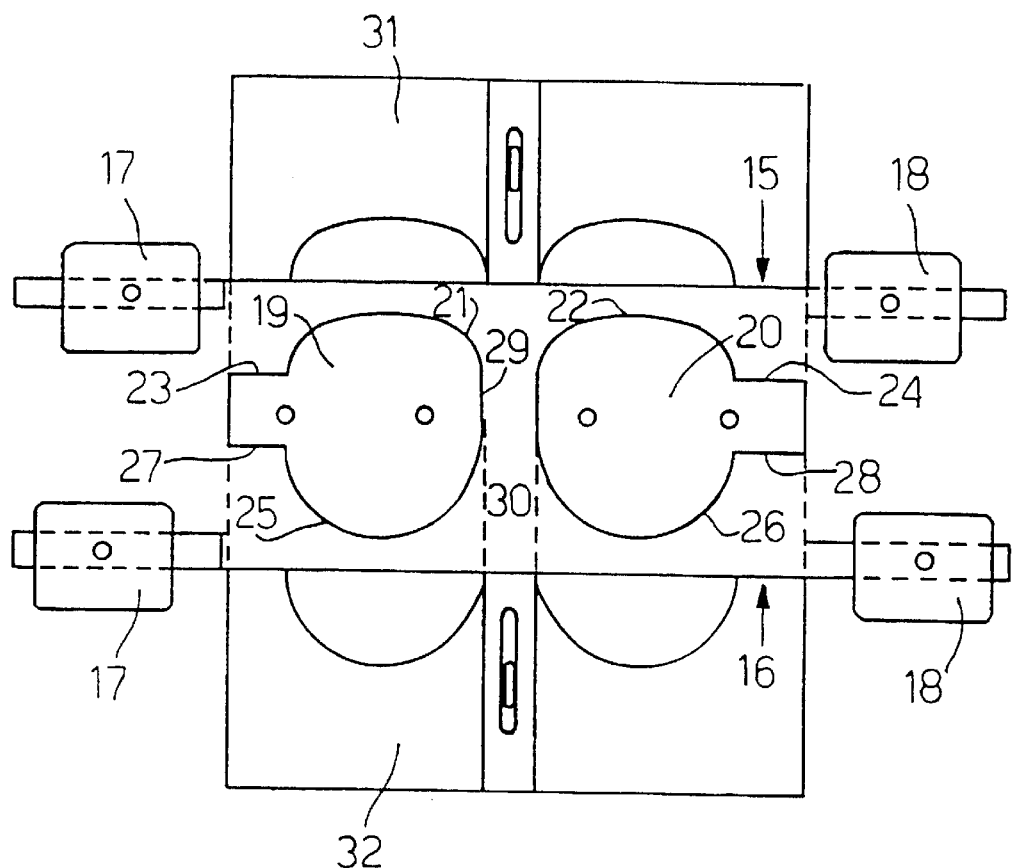
FIG. 1
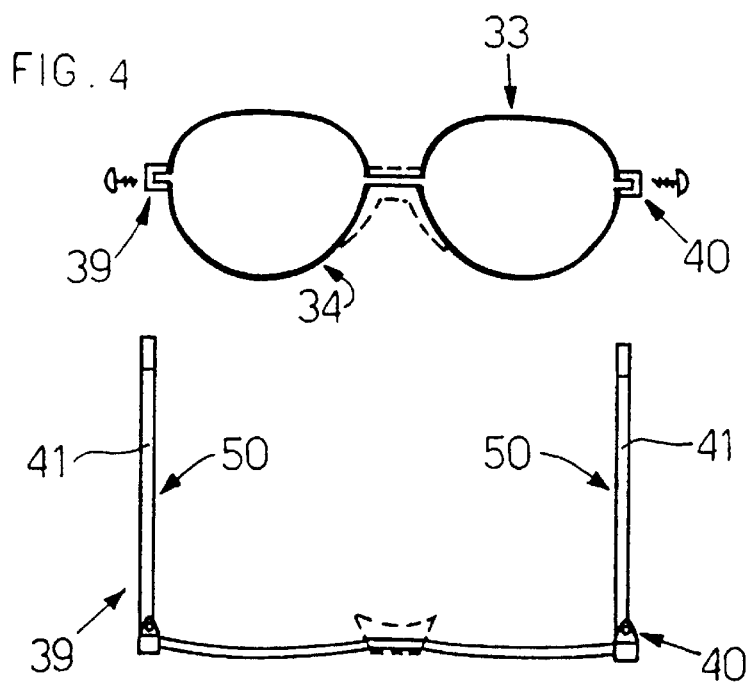
FIG. 4
FIG. 5

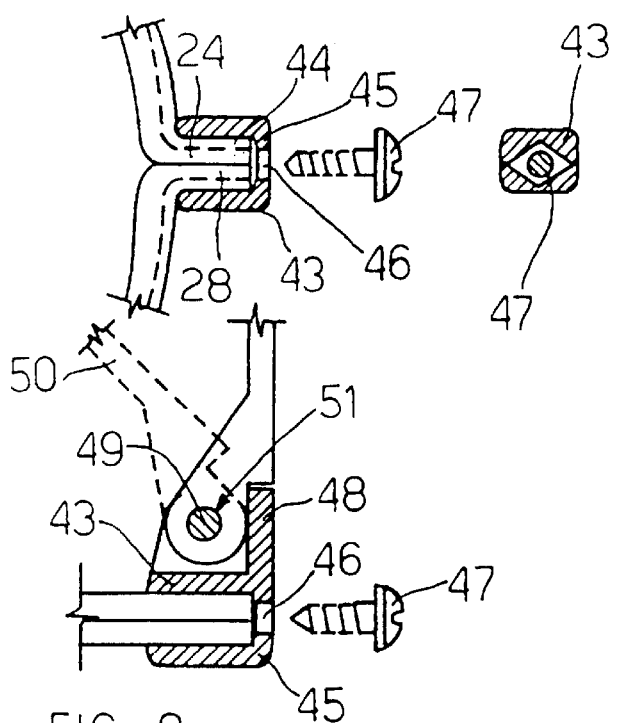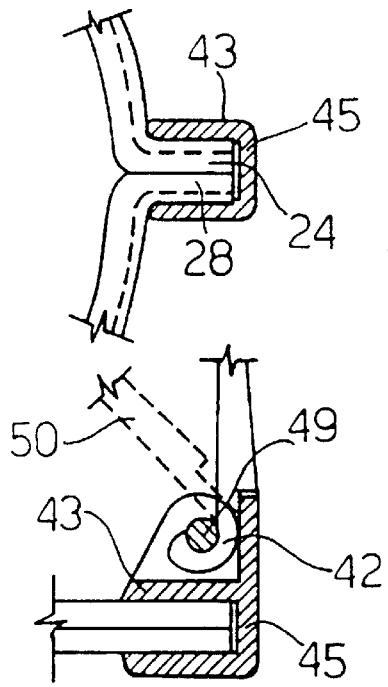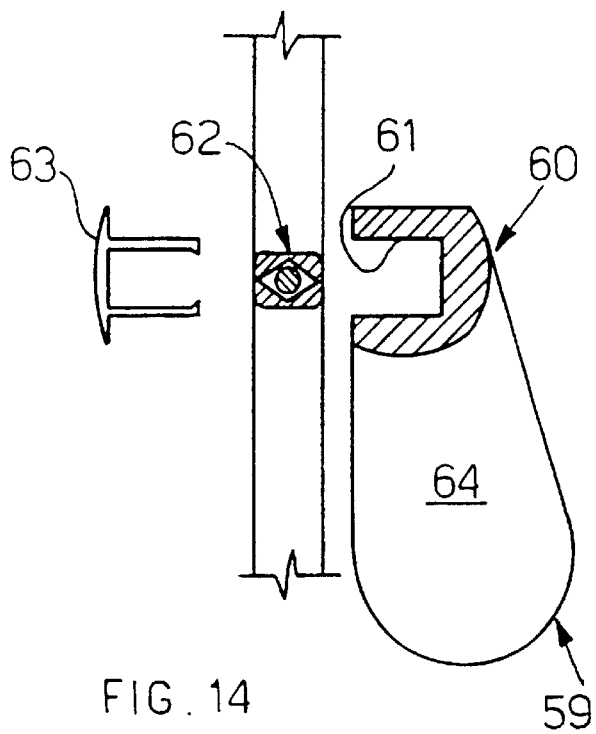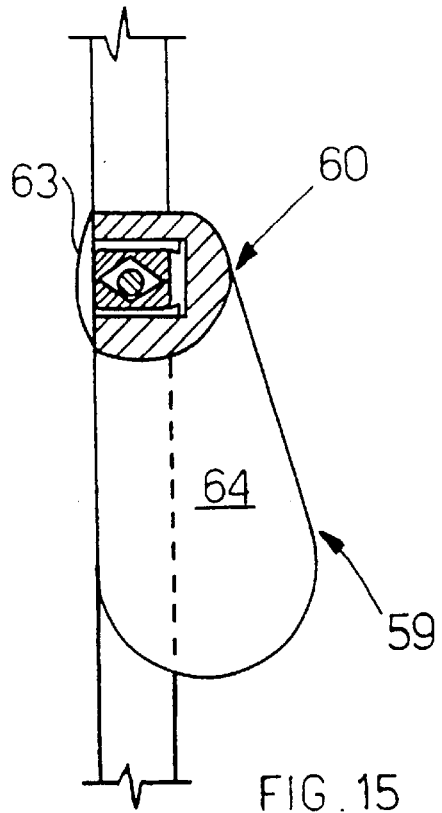

MANUFACTURING METHOD FOR SPECTACLES

FIELD OF THE INVENTION

The present invention relates to a manufacturing method for spectacles, which is capable of producing the component parts of a spectacle frame of a particular construction, the application of the support bars by means of a quick snap-on system and the assembling of the lenses in said frame while making use of the nosepiece as a locking key for the frame-and-lenses assembly, without employing welding points and possibly also screws.

DESCRIPTION OF THE PRIOR ART

Spectacles manufacturing is a process that is currently carried out by preliminarily preparing the relative frame, usually made of either plastic material moulded with some appropriate process such as injection moulding or cut from sheet stock, or metal from either sheet or wire stock, and then assembling subsequently such frame with the lenses as well as the support bars and the nosepiece.

Such a manufacturing procedure involves a number of labor intensive, i.e. manual working phases for both preparing the above cited frame and adapting and assembling the support bars, the nosepiece and the lenses in the same frame as well as the need to have at their own disposal:

1) expensive tools and machinery;
2) skilled and trained workforce for carrying out each particular working phase in the process;
3) long working times;
4) considerable usage of materials.

Such a manufacturing method therefore turns out to be quite complicated and expensive, while also implying the use of considerable amounts of materials for making the various component parts required by the particular construction.

SUMMARY OF THE INVENTION

It therefore is a purpose of the present invention to eliminate the drawbacks cited above in the spectacle manufacturing process by providing a spectacle manufacturing method of a semi-automated type that is capable of producing spectacles of different kind, shape and size with a) a few and simple working phases,
b) a reduced use of workforce,
c) considerably shorter working times,
d) lower usage of raw materials, auxiliary and secondary materials and products,
e) minimization of any possible type of waste and scrap.

This manufacturing method is obtained with the operational phases that are substantially described, with particular reference to the appended claims of the present patent.

BRIEF DESCRIPTION OF THE DRAWINGS

The invention will be understood better from the following description, given solely by way of not-limiting example and with reference to the accompanying drawings in which:

FIG. 1 shows schematically a front view of a first operative phase of the present manufacturing method and a relative tooling employed;

FIG. 4 shows schematically a front view of an intermediate product obtained in the subsequent third operative phase of the method referred to, in a different constructive version thereof;

FIG. 5 shows a plan view of the intermediate product of FIG. 4;

FIGS. 6 and 7 show a cutaway front view of the item of one of the component parts employed for the intermediate product of FIG. 4 in two different constructive versions thereof;

FIGS. 8 and 9 show a cutaway plan view of the item of the same component part employed in two further constructive versions thereof;

FIGS. 14 and 15 show a cutaway side view of the component part of FIG. 10, before and after having been fitted to the product.

DETAILED DESCRIPTION OF THE INVENTION

Figure 3:
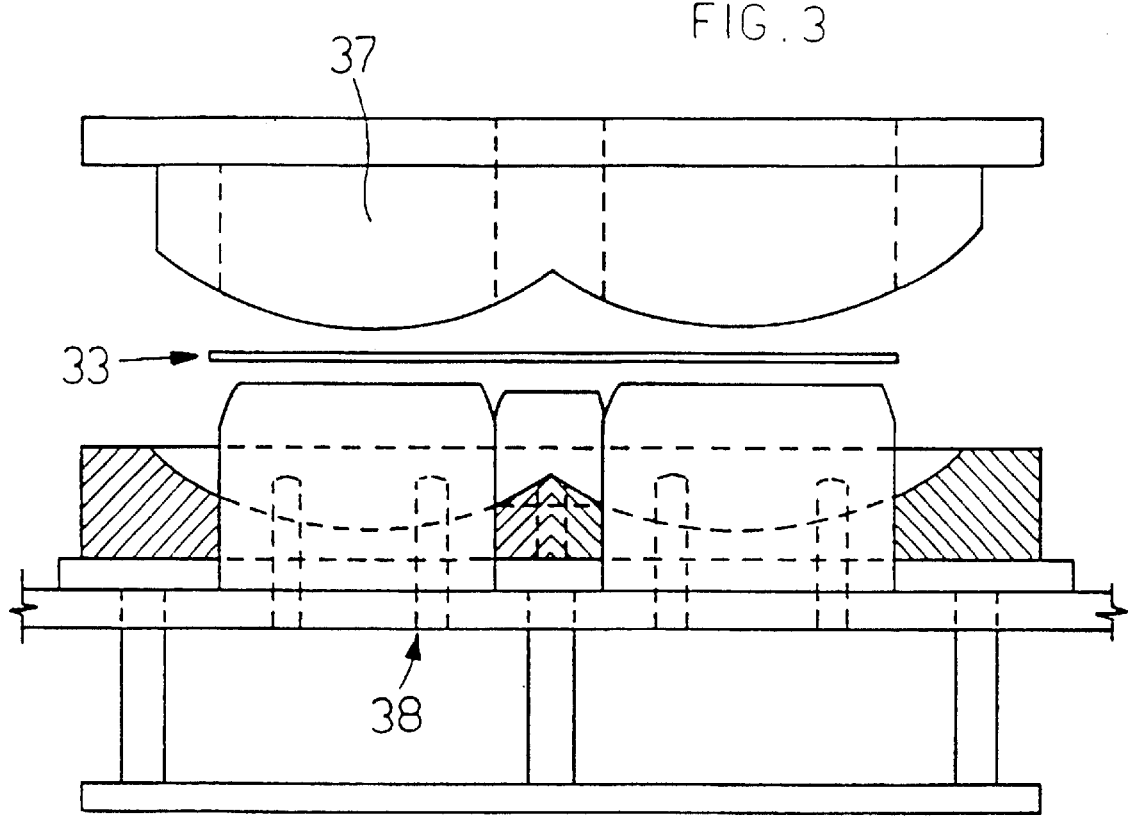
FIG. 3 shows schematically a plan view of a tooling employed during the second operative phase of the present manufacturing method.

The above listed figures illustrate schematically the various operative phases of the spectacle manufacturing method according to the invention, which is capable of producing in a semi-automated manner spectacles of both innovative and traditional type, that are usually formed by a frame, a pair of viewing lenses (in the case of sight glasses) or darkened lenses (in the case of sun glasses) or a pair of particular or treated viewing lenses (in the case of protective or sports glasses) as well as a pair of support bars or other spectacle supporting elements provided on the sides or on top of the frame, so as to be able to rest on the ears or the head of the wearer along with a single element or a pair or more elements acting as the nosepiece and intended to enable the spectacles to rest on the nose of the wearer.

In view of producing the above mentioned component parts of spectacles of differing type, form and size, according to the present invention use can be made of at least a thin section bar of preferably metallic material and particularly but not exclusively aluminum, either of natural type or anodized on its surface or also light alloys of other materials which have low weight and cost, and moreover is advantageously either notched or chamfered in a conventional manner along a side thereof in a rectilinear direction for the entire length of the section bar, said section bar being available commonly as parts or coils of different length and being cut in advance to portions of the same length, such that to permit to obtain the relative frame as it will be described below. Furthermore, the method calls also for the bars (arms) and the nose resting elements to be produced separately each time according to the particular models, i.e. special or standard, to be manufactured in accordance with market requirements, in view of being then able to subsequently apply them to each spectacle frame forepart manufactured with the considered method in the manner that will be described below.

The manufacturing method according to the present invention is carried out by performing a sequence of operative phases in which at least two wire portions, marked with the reference numerals 15 and 16 are employed, which have either the identical or different length from each other depending on the size of the frame to be obtained, and the end portions of which are inserted and adequately fixed removably into suitable pairs of centering and locking elements 17 and 18, in a manner that they are spaced from one another, extend in a horizontal direction and are aligned with each other in the same vertical plane. In addition, two patterns or templates 19 and 20, which are separated and aligned horizontally with respect to each other, are interposed in the spacing comprised between the wire portions 15 and 16 so as to shape the wire portions with the same form and a size which is slightly larger than that of the lenses, screens, filters and the like which will be respectively used for each kind of spectacles, in a way that the so shaped portions can be subsequently adapted thereon. Such templates are supported by an associated support (not shown) in a manner so as to be able to adjust from time to time preliminarily to the required extent the axial spacing therebetween and such an adjustment in the example referred to is effected by sliding alternately the support of each template in a corresponding rectilinear slot with horizontal extent (not shown), and can be obviously effected also in different ways and such that to achieve always the same function referred to.

These templates are respectively profiled with an upper bent half-portion 21 and 22 which extends at one side with a short rectilinear horizontal portion 23 and 24 and with a lower bent half-portion 25 and 26 which extends at one side with a short rectilinear horizontal portion 27 and 28, identical and coincident with the corresponding horizontal portion of the associated upper bent half-portion 21 and 22, and at the other side is joined to this latter by means of a respective short rectilinear vertical portion 29 and 30.

Furthermore, these templates are symmetrical to each other in a way that each pair of coincident horizontal portions is turned in an opposite direction with respect to the remaining pair of horizontal portions, and that the vertical portions 29 and 30 are turned towards each other and arranged approached to each other.

In order to permit each wire portion to be adapted onto these templates, it is centered onto these latter in a manner that they insert themselves in the notch or chamfer of said wire portions during the first operative phase of the present manufacturing method.

Finally, always referring to FIG. 1, it is noted that the wire portions 15 and 16 and the pattern 19 and 20 cooperate with a shaping tool constituted advantageously by at least a die formed by a first upper half-die 31 and a second lower half-die 32, which are respectively situated above the first wire portion 15 and below the second wire portion 16, at a position into contact with the corresponding wires and aligned with respect thereof and the pattern, said first and second half-die being shaped with the same outline of the corresponding upper bent portions 21, 22 and lower bent portions 25 and 26 as well as rectilinear horizontal portions 27, 28 of the relative pattern 19, 20 and with a flat horizontal outline at the level of the respective vertical portions 29, 30 of said upper and lower bent portions, in this latter case providing for the frame joining piece as it will be described later.

In the first operative phase of the method according to the invention, still referring to FIG. 1, it is noted that the first and the second half-die 31 and 32 are operated contemporaneously in a known manner, from their starting raised position of FIG. 1 firstly in a relationship approached to each other, with a stroke adjustable with conventional means, in order to enclose closely the assembly wire portions-patterns thereby providing for shaping of two frame half-portions assuming the outline of the corresponding upper half-die 31 and lower half-die 32 and thereafter in a relationship moved away from each other by returning back to the position illustrated in FIG. 1 so that the frame half-portions 33 and 34 can be extracted from this position and submitted to the subsequent operative phase.

In particular, such an extraction is performed by using either different manual systems or a possible automatic mechanical means of per se known type, which after the frame half-portions have been drawn therefrom provides for arranging them for the subsequent operative phase which will be described.

The following second operative phase of the present method is performed with at least an apparatus shown in FIG. 3 in order to match the rectilinear outline of the frame to the convex outline of the lenses onto which it will be subsequently fitted and is called meniscus shaping phase.

This apparatus is composed of a die formed by a first and a second half-die 37 and 38 which are situated at a position opposed from each other and coincident to each other at the level of the two longitudinal sides which are opposite to the frame and shaped with outlines which are complementary and perfectly mating to each other and identical to the outline of the lenses, screens, filters and the like as well as that of the central joining piece.

Moreover, half-dies 37 and 38 are formed by movable component parts capable of changing the distance between the lenses, screens, filters and the like and being adaptable for lenses, screens, filters and the like with different and variable size and shape.

This die is operated from a starting opened position, evident from FIG. 3 in which the two half-dies 37 and 38 are opened and arranged for accomodating the frame half-portions therebetween to a closed position (not shown) in which such frame half-portions are enclosed by the half-dies with consequent shaping of the required outline thereof.

Figure 2:
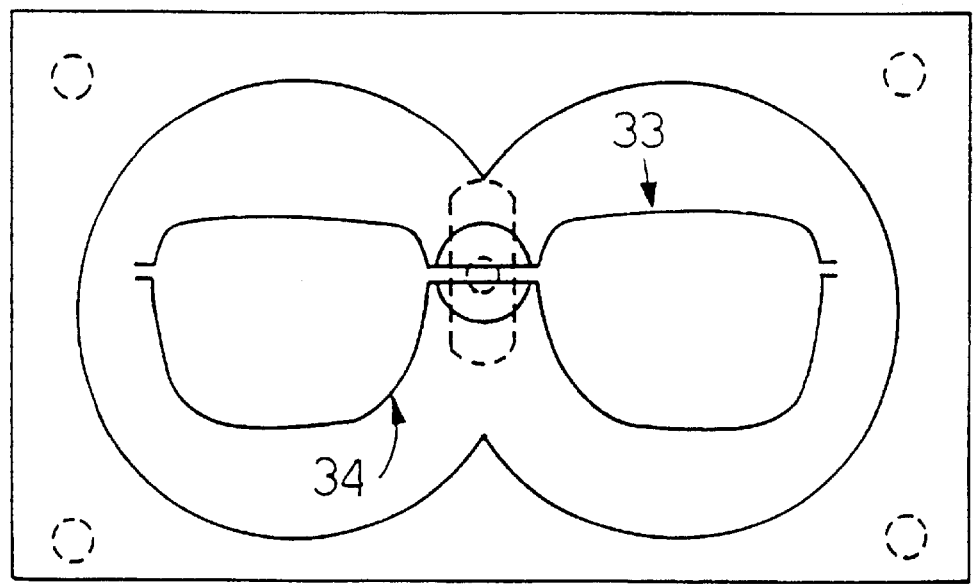
FIG. 2 shows schematically a front view of an intermediate product obtained from the present method, on a constructive version thereof, during the second operative phase of the present manufacturing method.

FIG. 2 shows an intermediate product made in a constructive version thereof and shaped of trapezoidal form. of course, according to the invention it is also possible to use apparatus of a kind different than that described solely by way of example, provided that the same involve the carrying out of operative phases identical or similar to those described and claimed in the present patent.

Turning now to the FIGS. 4 and 5, there is shown an intermediate product obtained in the subsequent third operative phase of the present method, which product in the example shown is made in a constructive version with a form different with respect to that of FIG. 2, namely an elliptical instead of trapezoidal form. In this third operative phase, in particular, the corresponding pairs of rectilinear horizontal portions of the frame half-portions 33 and 34 are joined together without need of welding by a respective hinging block 39 and 40 shown in different versions thereof in FIGS. 6–11 which are provided for the bar articulation. In particular, such arms or bars are shaped with an extended rectilinear portion 41 which at its articulation end portion is either bent in the shape of a curl 42, or is shaped rectilinearly in a conventional manner and these arms or bars are manufactured with different shapes, types and sizes by utilizing apparatus of traditional kind or are also designed specifically.

In turn, the hinging blocks are shaped as it will be described also by utilizing apparatus either of traditional kind or designed specifically for the use, and they shall anyway be in all cases such as to be capable of receiving and accomodating the corresponding tenon of the bar.

These hinging blocks are attached in position by means of sticking material of traditional kind such as cements, adhesives, resins or also fixing means also of traditional kind (screws etc.).

In the example illustrated in FIG. 6, it is noted that each hinging block is constituted by a bush 43 with rectangular shape which can be fitted onto each pair of rectilinear horizontal portions and accordingly is provided with an inner cavity 44 open at a side thereof, so as to enable these horizontal portions to be inserted therein, and closed at the other side thereof by a bottom 45 in which a through hole 46 for the passage of a screw 47 or the like is provided, so as to lock the bush onto the corresponding rectilinear portions. Moreover, such bush is integral with either a hinge, fixed joint or similar structure of traditional type, or some articulation members or levers of per se known type (not shown) for the articulation of the corresponding bar.

In FIG. 7 it is noted that each hinging block is constituted always by a bush 43, adaptable onto the corresponding rectilinear horizontal portions, however in this case it is not provided with a through hole and a screw and is fitted by means of glueing to the same portions.

In FIG. 8 it is noted that each hinging block is constituted always by a bush 43 with a through hole 46 and a locking screw 47, which bush in this case is shaped with a support structure 48 orthogonal thereto, provided with a transversal stud 49 for the articulation of a corresponding bar 50 which stud is inserted into a corresponding through hole 51 of the same bar.

In FIG. 9 it is noted that each hinging block is constituted like that of FIG. 8 and differs therefrom in that the bush 43 is not provided with a through hole and a locking screw and is glued into position as the bush in FIG. 7 and that the bar 50 instead of having a through hole 51 is shaped with a curl 42 at the portion thereof which is articulated to the frame which curl is consequently hooked directly on the transversal stud 49 (tenon hooking system).

Figure 10:
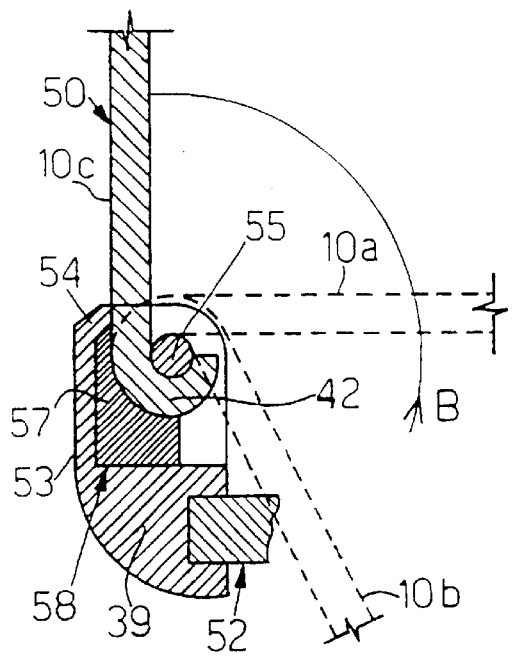
FIGS. 10 and 11 show a respective cutaway side view and front view of the same component element of FIGS. 8 and 9 in a different constructive version thereof.
Figure 11:
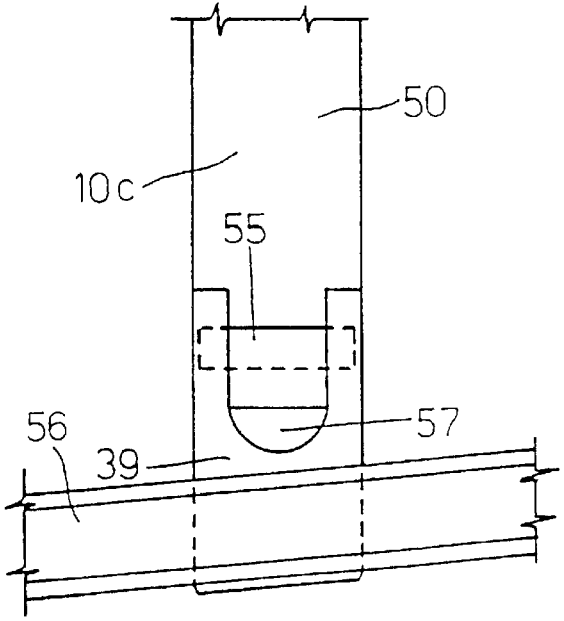

In FIGS. 10 and 11 it is noted that each hinging block is provided with a hollow 57 which can be inserted on to each pair of rectilinear horizontal portions of the frame half-portions 33 and 34 and extends towards the user's face shaped as a U configuration, the bottom 53 of the U being turned outwardly and slightly bent inwardly at its free end portion 54 for the stopping abutment of the bar at the fully opened position thereof.

A tenon-like stud indicated at 55 is fixed by riveting at its ends on the two wings of the U-shaped configuration. The curl 42 of the bar is then hooked pivotably around said stud with the manoeuvre indicated in FIG. 10 which enables the bar to move from the position 10b, as indicated with dotted lines in the cited figure and as made possible by the frame 56 before the lenses, glasses etc. are mounted therein through the forepart of the spectacle frame, again indicated with dotted line, up to the position 10c indicated with continuous lines, by means of a rotation according to the arrow B.

A dowel 57 fills the U-shaped cavity 58 of the hinging block, thereby reconstituting the convex surface of the curl 42 and adhering thereto, in such a manner as to enable the bar to continuously maintain the position that is each time imparted to it, in particular the position in which it is due to adhere to the user's temples, thereby ensuring that the spectacles themselves remain well-fitting on the head and do not slip down the nose, and furthermore to prevent the same bar from possibly breaking down or breaking loose even after a prolonged period of use, as this on the contrary tends to occur rather frequently with spectacles of traditional type.

This is effective in enabling the well-known drawback encountered with spectacle bars of usual design in which the articulated joint thereof can be noticed to gradually work itself slack and loose so that the bars left in a loosely hanging condition are no longer able to maintain a stable position and start oscillating freely to be effectively avoided.

To the purpose of the present invention, the material which the dowel is made of shall substantially be a rigid one.

Figure 12:
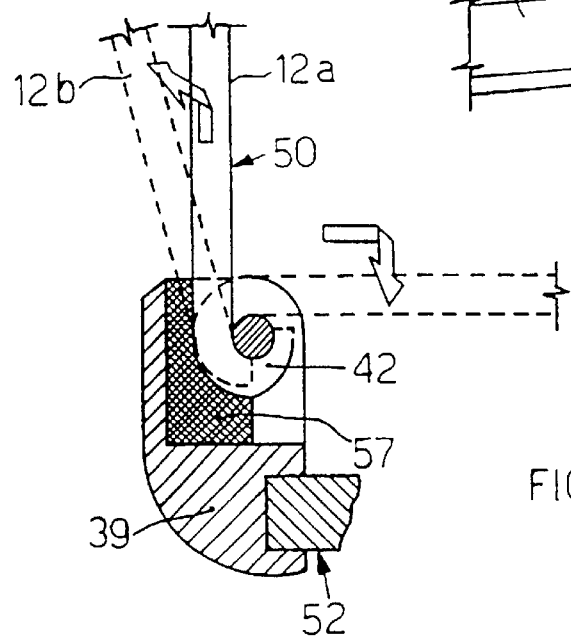
FIG. 12 shows a cutaway side view of the same component element in a further constructive version thereof.

In FIG. 12 there is illustrated another embodiment wherein the dowel 57 instead of being made of a substantially rigid material is made of elastic material such as rubber, buna, synthetic resins, so that the bar, when the spectacles are applied to the user's face, is able to move elastically from the position 12a (full lines) to the position 12b (dashed lines), while it is the elastic pressure of the now visibly deformed dowel 57, which acts as a shock-absorber, that keeps the bar adhering against the head and, therefore, improves the adaptability thereof to the head of the users, thereby considerably adding to the wearing comfort of the spectacles without having to make use of expensive elastic hinges to reach that aim. obviously, the hinging blocks described by way of example may be made also in different manners, provided that they can join both the frame half-portions without need of weldings, thus without departing from the protection sphere of the invention.

Thereafter, onto the so obtained product there are applied the bars to the hinging blocks, providing for the bar articulation.

These bars 50 are attached in position by means of fixed joints and studs or similar articulation means, in the case in which the frame is provided either with conventional hinges or articulation members or levers of per se known type.

The bar applying operations may be effected either manually or by means of suitable automatic apparatus. In the subsequent fourth operative phase of the present manufacturing method, the mutually assembled frame and bars are caused to undergo appropriate chemical treatment processes of a per se known type to protective cleaning and surface-finishing purposes adapted to confer the necessary anticorrosion and resistance properties to the materials used so as to above all enable them to comply with the existing sanitation and health regulations, as well as to produce the decorating, finishing and general aesthetic effects desired.

In this case it is also possible for the protective and finishing treatments to be eliminated from the actual spectacle manufacturing process, preferably by using during this operative phase of the process, materials that have been subjected to these treatments directly by the suppliers of the same materials and therefore supplied in such a pre-finished condition to the spectacle manufacturers.

In the subsequent fifth operative phase of the present method, the respective lenses are then inserted in each frame either manually or automatically by means of appropriate automated equipment.

Upon the lenses having been so inserted, the whole set is pressed tightly together in an appropriate manner, thereby completing the assembly of each type of spectacles.

In this case use can be made according to actual needs and utilization scopes, of lenses of various types, shades and hues for either viewing glasses or sunglasses, presentation or advertising lenses, etc., as well as protective lenses and/or screens of various kind, filters, etc., for use in the most varied areas of application, such as for instance factory workshops, offices, sports and leisure, etc.

Figure 13:
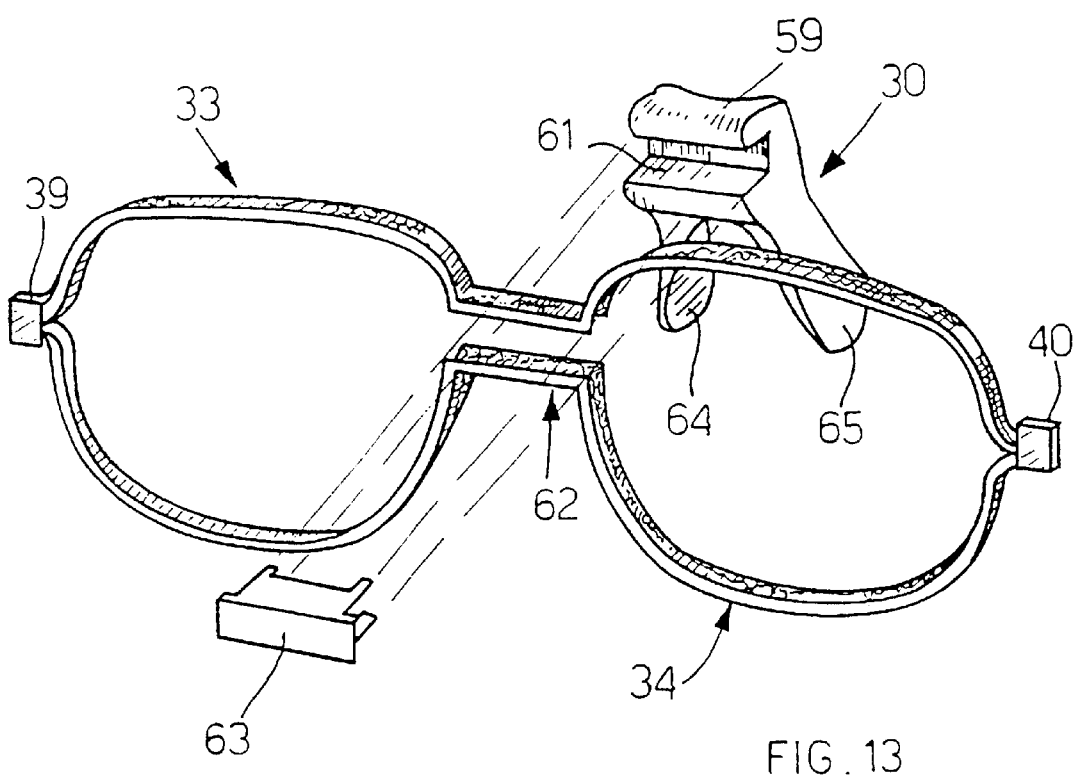
FIG. 13 shows a front view of another component part employed for manufacturing the spectacles.

Furthermore, the bars are equipped with the related terminal pieces that are available separately and are to this purpose slipped on the same bars, again manually or by means of appropriate automated equipment. The tightening together of each such frame, under resulting locking in position of the lenses, screens, filters etc. used to so complete the spectacles, is carried out by preferably using an appropriate separate clamping piece 59 made of plastic material (see FIGS. 13–15), in the form of a central body 60 provided with a rectilinear recess 61 capable of being snap-fitted onto the joining piece 62 of the related frame and fastened on the same piece by means of a counterclamp 63, said clamping piece being further so formed as to feature two side shanks 64 and 65 which extend downwards from said central body and are so shaped as to be capable of fitting on the nose of each person.

It will be appreciated that, instead of using the clamping piece 59 to act as a single nose-resting piece, the possibility also exists for two or more nose-resisting pieces of various type, readily available on the market, to be used to this purpose, which are anyway capable of tightening together the frame either with a similar operation or also with possible fixing means of per se known type, thus without departing from the protection sphere of the present invention.

At this point, the advantages of the spectacle manufacturing method according to the present invention are fully clear and can be summarized as follows:
1. minimization of possible break-down points;
2. spectacle construction requiring no welding and possibly without use of screws;
3. utilization of raw materials that have never or at most scarely been used before in spectacle manufacturing (such as aluminum, copper and various alloys etc.);
4. use of an articulation joint (tenon) that is totally different from the joints used hitherto;
5. simplified assembly of the various component parts of the spectacles;
6. modular construction of the spectacles allowing for all of the elements thereof to be easily interchangeable, i.e. replaced in a simple, elementary manner (owing to either breakages, adjustments, or even to adaptation to changing fashions or personal requirements);
7. drastic reduction in manufacturing costs of each component part of the spectacles;
8. elimination of the dependence on particular people for repairs, service or the like, thanks to the easy manner in which the various elements can be replaced (direct assembly by the client);
9. variation of the models by interchanging different parts or component parts of the spectacles;
10. reduction in time and labor requirements as well as in the operative phases needed;
11. improved structural strength of the spectacles, thanks to the complete elimination of welding and the possibility to eliminate also screws or equivalent means;
12. lower usage and, therefore, greater savings of the materials used owing to the utilization of chamfered wire that is used integrally in each frame so produced thereby eliminating scraps;
13. use of pre-treated materials thereby doing away with the need for corresponding surface protection and finishing treatments of any kind to be carried out at the factory;
14. greater safety assured in the various conditions of use.

What is claimed is:

1. A manufacturing method for spectacles comprising a frame formed by first and second frame half-portions joined with each other through a joining piece, a pair of lenses, screens or filters respectively enclosed by said first and second frame half-portions, a pair of support bars provided with terminal elements, and a possible nose-piece element applied onto said frame, said frame being made with a profiled wire of preferably metallic material, particularly aluminum or light alloys, said profiled wire having first and second portions, said method comprising:

compressing said first and second wire portions by first compression means in a first phase adapting them around shaped means having the same form and a size slightly greater than that of said lenses, screens or filters, so as to form said first and second frame half-portions;

compressing said first and second frame half-portions by second compression means in a second phase to shape said first and second half-portions around said shaped means with the same outline of the lenses, screens or filters;

joining said first and second half-portions to said respective support bars through articulation means attached to the corresponding frame half-portions in a third phase;

submitting said first and second frame half-portions and said bars to possible chemical treatments in a fourth phase for surface protection, cleaning and finishing so as to confer to them the desired aesthetical and decorating effects, if such treatments are needed; and applying in a fifth phase said lenses, screens or filters to said first and second frame half-portions and equipping said bars with terminal elements, and subsequently applying said nosepiece element onto the assembled frame half-portions with lenses, screens or filters, and tightening said assembly.

2. The method according to claim 1, wherein said first and second wire portions are either notched or chamfered along a side thereof in a rectilinear direction for the size of the frame to be obtained.

3. The method according to claim 2, wherein said shaped means comprises a first and a second template or pattern, which are symmetrical and aligned horizontally and reciprocally spaced from each other to an extent equal to a distance between said lenses, screens or filters, said distance being adjustable before said first operative phase is carried out.

4. The method according to claim 3, wherein said first compression means comprises a first and a second half-die respectively situated above said first wire portion and below said second wire portion at a position in contact with the corresponding wires and aligned with respect thereto and said first and second pattern.

5. The method according to claim 4, wherein said second compression means comprises a first and a second half-die opposite to each other and coinciding with two opposite longitudinal sides of said first and second frame half-portions.

6. The method according to claim 1, wherein said articulation means comprises a first and a second hinging block attached laterally to said first and second frame half-portions by means of either sticking materials such as cements, adhesives and resins of various kind, or fixing means, for supporting a corresponding bar in an articulated manner.

7. The method according to claim 6, wherein said hinging blocks are formed respectively by a bush integral either with a hinge or a fixed joint, or articulation members or levers, for the articulation of the corresponding bar.

8. The method according to claim 6, wherein each hinging block extends towards the user's face with a U-shaped configuration, said hinging block being provided with a tenon for the related bar to be hooked onto, as well as a filling dowel for each bar to be enabled to stay in the position imparted to it each time, said hinging block forming an abutment for the corresponding bar, to be stopped against it when said bar is folded into the fully opened position thereof.

9. The method according to claim 8, wherein said dowel is made either of a rigid material or of an elastic material such as rubber, buna or synthetic resins.

10. The method according to claim 8, wherein each bar is shaped with an elongated rectilinear portion, which is bent in to a curl configuration at its end articulated with said tenon of said frame, and is manufactured to different shapes, topologies and sizes.

11. The method according to claim 1, wherein said nosepiece element is formed by a separate clamping piece made of plastic material, shaped with a central body provided with a rectilinear recess capable of being fitted onto said joining piece and fastened thereon by means of a counterclamp, as well as shaped with two side shanks extending downwards from said central body and so shaped as to be capable of fitting on the nose of the user.

* * * * *